(12) United States Patent
Rickis et al.

(10) Patent No.: US 10,088,057 B2
(45) Date of Patent: Oct. 2, 2018

(54) UNDER VANE VALVE PISTON STRUCTURE

(71) Applicant: Hamilton Sundstrand Corporation, Charlotte, NC (US)

(72) Inventors: Aaron F. Rickis, Feeding Hills, MA (US); Francis P. Marocchini, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 621 days.

(21) Appl. No.: 14/536,801

(22) Filed: Nov. 10, 2014

(65) Prior Publication Data
US 2016/0131266 A1    May 12, 2016

(51) Int. Cl.
| | | |
|---|---|---|
| *F04C 14/22* | (2006.01) | |
| *F16K 3/02* | (2006.01) | |
| *F04C 2/32* | (2006.01) | |
| *F01C 21/08* | (2006.01) | |
| *F04C 2/344* | (2006.01) | |

(52) U.S. Cl.
CPC ........ *F16K 3/0218* (2013.01); *F01C 21/0863* (2013.01); *F04C 2/32* (2013.01); *F04C 2/344* (2013.01)

(58) Field of Classification Search
CPC ......... F01C 21/0863; F04C 2/344; F04C 2/32
USPC .......................................................... 418/260
See application file for complete search history.

(56) References Cited

U.S. PATENT DOCUMENTS

| | | |
|---|---|---|
| 1,681,494 A | 8/1928 | Noble |
| 2,747,612 A | 5/1956 | Lee |
| 3,039,448 A | 6/1962 | Stucke |
| 4,085,766 A | 4/1978 | Weigl et al. |
| 4,126,155 A | 11/1978 | Bertram |
| 4,198,368 A | 4/1980 | Nightingale |
| 4,268,472 A | 5/1981 | Nightingale |
| 4,848,404 A | 7/1989 | Hickok |
| 4,941,508 A | 7/1990 | Hennessy et al. |
| 6,167,909 B1 | 1/2001 | Davis |
| 8,316,880 B2 | 11/2012 | Grosskopf et al. |
| 8,348,646 B2 * | 1/2013 | Fujita .................... F04C 14/226 417/220 |
| 2012/0112113 A1 | 5/2012 | Holmes et al. |
| 2014/0109979 A1 | 4/2014 | Rickis et al. |
| 2014/0110618 A1 | 4/2014 | Rickis et al. |
| 2014/0158227 A1 | 6/2014 | Rickis et al. |

* cited by examiner

*Primary Examiner* — Mark Laurenzi
*Assistant Examiner* — Anthony Ayala Delgado
(74) *Attorney, Agent, or Firm* — Carlson, Gaskey & Olds, P.C.

(57) ABSTRACT

A valve has a sleeve with at least one outlet port in a radially outer surface. A piston is moveable within the sleeve along an axis. The piston has a lip on a radially outer portion extending forwardly to an axially forward most end and a recess radially inward from the lip with respect to an axis of the piston. A vane pump is also disclosed.

10 Claims, 2 Drawing Sheets

UNDER VANE VALVE PISTON STRUCTURE

BACKGROUND OF THE INVENTION

This application relates to improvements in the piston for an under vane pressure regulating valve.

Vane pumps in compressors are known and, typically, include a plurality of vanes that extend outwardly of a rotor. The vanes are brought into contact with a cam surface of a casing or stator. As the rotor turns, the vanes move radially inwardly and outwardly of the rotor moving an entrapped fluid. The rotor is mounted within the casing. The distance between the outer surface of the rotor and the cam surface changes, such that the vanes are driven inwardly and outwardly, allowing filling and pressurizing of a fluid.

One feature commonly used in vane pumps and compressors is under vane pressure. This assists in biasing a vane outwardly of the rotor.

Valves are known to regulate the pressure of the fluid delivered to the under vane cavities to properly bias the vane. These valves are generally comprised of a valve set, a piston installed into a sleeve, installed into a housing bore. Typically, these valves have had a piston with a flat forward face or sometimes a "nosed" face with a central protrusion. A pressure from fluid in the under vane cavity is placed on this forward face and may move the vane to allow this fluid to communicate with an outlet leading to a pump chamber. Fluids reacting off the flat or "nosed" face and moving toward the outlet have a significant axial component as well as a radial component.

Thus, in the past, contaminants entrained in this fluid have sometimes been forced into a space between a radially outer surface of the piston, and a radially inner surface of a sleeve by pressure delta and fluid forces.

This is undesirable and can lead to valve seizure.

SUMMARY OF THE INVENTION

A valve has a sleeve with at least one outlet port in a radially outer surface. A piston is moveable within the sleeve along an axis. The piston has a lip on a radially outer portion extending forwardly to an axially forward most end and a recess radially inward from the lip with respect to an axis of the piston. A vane pump is also disclosed.

These and other features may be best understood from the following drawings and specification.

DETAILED DESCRIPTION

Figure 1:
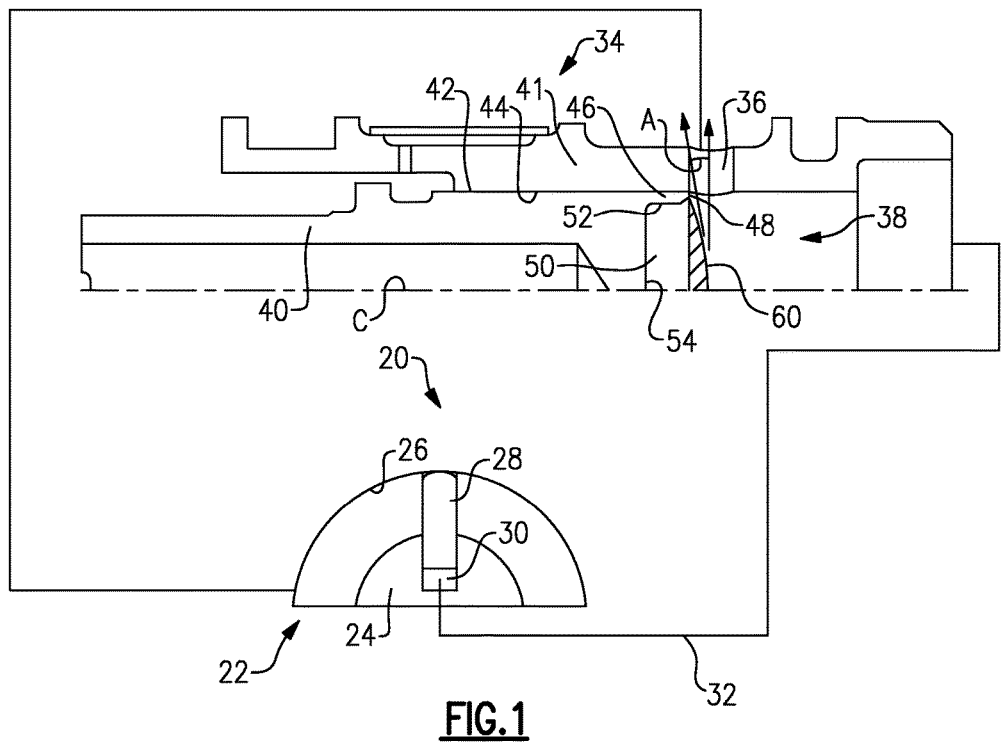
FIG. 1 shows a system, somewhat schematically.

A system 20 is illustrated in FIG. 1 and includes a vane pump or compressor 22. As known, a rotor 24 is mounted within a casing 26. Vanes 28 extend radially outwardly of the rotor and contact an inner surface of the casing 26. The distance between an outer surface of rotor 24 and the inner surface of the casing 26 changes such that the vanes move inwardly and outwardly. A fluid is found in chambers between adjacent vanes and is moved between a fluid inlet and a fluid outlet.

Fluid is tapped into an under vane chamber 30 to bias the vanes 28 toward the inner wall of the casing 26. In system 20, a pressure regulating valve 34 maintains a desired pressure in the under vane cavity 30. As shown, a line 32 communicates the under vane cavity 30 to a forward chamber 38 of the valve 34.

A piston 40 regulates the flow between the chamber 38 and an outlet port 36 in a radially outer wall of a sleeve 41. A forward end of the piston 40 includes a radially outer peripheral surface 42 which is desirably closely spaced from a radially inner surface 44 of the sleeve 41. A forward lip 46 of the piston 40 extends to an axially outermost end 48. A cupped depression or recess 50 extends inwardly cylindrical the end 48 and at radially central regions of the piston 40.

Figure 2:
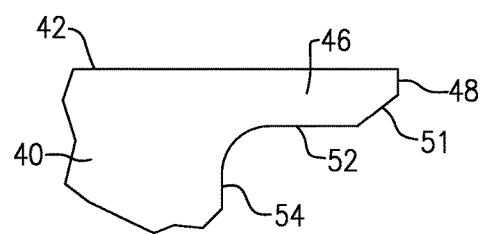
FIG. 2 shows a detail of the FIG. 1 piston.

As shown, a chamfer 51 (see FIG. 2) leads into a side wall 52 and then to a bottom surface 54 of the recess 50.

As shown in this embodiment, fluid reacting off of the forward face and moving to the outlet 36 has a much smaller axial component than the prior art.

Thus, contaminants are much less likely to be forced into the space between surfaces 42 and 44.

The recess 50 affects the shape of a stagnation region 60 at a center of the piston 40. This, in turn, affects the flow stream of fluid such as shown by arrows in FIG. 1 through the outlet port 36. The fluid moves at an angle A relative to a central axis C along which the piston 40 moves.

In the FIG. 1 piston, the stagnation region 60 generally includes the area of the recess and, thus, the fluid is directed radially outwardly at an angle much greater than the prior art. As an example, the FIG. 1 piston has a fluid flow angle A of between 80 and 90° when measured from the axis of movement of the valve.

Figure 3A:
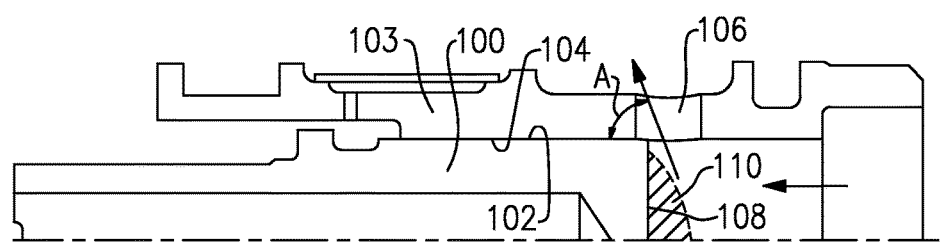
FIG. 3A shows one prior art piston.

As shown in FIG. 3A, one prior art piston 100 has an outer peripheral surface 102 spaced from a casing 103 inner peripheral surface 104. The outlet 106 is positioned similar to the FIG. 1 embodiment. The piston 100 has a flat face 108. The stagnation region 110 is forward of that region. The angle A is approximately 69°. This results in fluid, containing impurities, having a greater likelihood of being forced between the surfaces 102 and 104, which is undesirable.

Figure 3B:
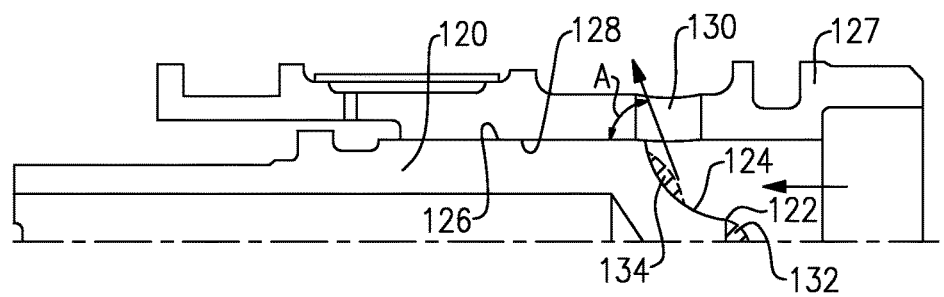
FIG. 3B shows another prior art piston.

Similarly, as shown in FIG. 3B, a "nosed" piston 120 has a forward nose 122, and a curving surface 124 leading to an outer peripheral surface 126. The sleeve 127 has an inner peripheral surface 128. The outlet 130 receives fluid at an angle A. The stagnation regions 132 and 134 are forward of the piston surfaces 122 and 124. The angle A in this embodiment may also be approximately 69°. Here again, the likelihood of contaminants moving between surfaces 126 and 128 is increased due to this angle, has a greater axial component than the FIG. 1 embodiment angle.

With the FIG. 1 piston, less contaminants will reach the area between surfaces 44 and 42.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A valve for regulating a pressure in under vane chambers in the vane pump, and comprising:
   a sleeve having at least one outlet port in a radially outer surface;
   a piston moveable within the sleeve along an axis, the piston having a forward face with a lip on a radially outer portion extending forwardly to an axially forward most end and a recess radially inward from the lip with respect to an axis of the piston; and an inlet to said valve being formed at an axially forwardmost end of said sleeve and directing fluid against said forward face of said piston, and said inlet communicating with under vane chambers in vanes associated with a vane pump, and at least one outlet formed through said sleeve and radially outwardly of said forward face of said piston, such that said piston controlling flow between said outlet and the under vane chambers.

2. The valve as set forth in claim 1, wherein said recess includes a chamfer extending from said axially forward most end leading into said recess.

3. The valve as set forth in claim 2, wherein a cylindrical side wall connects said chamfer into a bottom surface of said piston.

4. The valve as set forth in claim 2, wherein said recess creates a stagnation region and results in fluid being deflected from said piston into said outlet port at an angle between 80 and 90°.

5. The valve as set forth in claim 1, wherein said recess creates a stagnation region and results in fluid being deflected from said piston into said outlet port at an angle between 80 and 90°.

6. A vane pump and system comprising:
a vane pump including a rotor carrying at least one radially moveable vane, and an outer casing defining a cam, said vane being moveable along said cam to move a fluid;
an under vane chamber for receiving a pressurized fluid, said under vane chamber communicating with an under vane pressure regulating valve, said under vane pressure regulating valve including a sleeve with at least one outlet port in a radially outer surface; and
a piston moveable within the sleeve along an axis, the piston having a forward face with a lip on a radially outer portion extending forwardly to an axially forward most end and a recess radially inward from the lip with respect to an axis of the piston; and
an inlet to said under vane pressure regulating valve being formed at an axially forwardmost end of said sleeve and directing fluid against said forward face of said piston, and said inlet communicating with said under vane chamber, and at least one outlet formed through said sleeve and radially outwardly of said forward face of said piston, such that said piston controlling flow between said outlet and the under vane chambers.

7. The vane pump and system as set forth in claim 6, wherein said recess includes a chamfer extending from said axially forward most end leading into said recess.

8. The vane pump and system as set forth in claim 7, wherein an inlet to said valve is formed at an axially forward most end of said sleeve and directs fluid against a forward face of said piston.

9. The vane pump and system as set forth in claim 7, wherein said recess creates a stagnation region and results in fluid being deflected from said piston into said outlet port at an angle between 80 and 90°.

10. The vane pump and system as set forth in claim 6, wherein said recess creates a stagnation region and results in fluid being deflected from said piston into said outlet port at an angle between 80 and 90°.

* * * * *